United States Patent [19]
Shutt et al.

[11] 3,963,506
[45] June 15, 1976

[54] FIRED CONSTRUCTION SHAPES AND PROCESS AND BINDER THEREFOR

[75] Inventors: Thomas Clifford Shutt, Arvada; Howard Campbell, Golden, both of Colo.

[73] Assignee: Glass Container Manufacturers Institute, Inc., Washington, D.C.

[22] Filed: May 6, 1974

[21] Appl. No.: 468,574

Related U.S. Application Data

[63] Continuation-in-part of Ser. No. 303,188, Nov. 2, 1972, abandoned.

[52] U.S. Cl. .................................. 106/67; 106/73.6
[51] Int. Cl.² ........................................ C04B 35/64
[58] Field of Search ...................... 106/67, 73.6, 55

[56] References Cited

UNITED STATES PATENTS

| | | | |
|---|---|---|---|
| 2,051,964 | 8/1936 | Norton | 106/67 |
| 2,860,999 | 11/1958 | Ueltz et al. | 106/44 |
| 3,509,072 | 4/1970 | Barrington et al. | 106/44 |

*Primary Examiner*—J. Poer
*Attorney, Agent, or Firm*—Kenyon & Kenyon Reilly Carr & Chapin

[57] ABSTRACT

Structural clay products such as bricks, tile and blocks are made using waste soda lime glass, other inorganic materials and ball clay. The products are produced at the relatively low firing temperatures between 1300° and 1900°F and are of minimum porosity.

10 Claims, No Drawings

FIRED CONSTRUCTION SHAPES AND PROCESS AND BINDER THEREFOR

CROSS-REFERENCE TO RELATED APPLICATIONS

This is a continuation-in-part of copending parent application, Ser. No. 303,188, filed, Nov. 2, 1972, now abandoned.

BACKGROUND OF THE INVENTION

Glass containers and the like, produced from soda lime glass, have been and are in great demand because of their many beneficial attributes. However, after use they are subject to breakage and great difficulty has been encountered in the disposal or reclamation of such glass. Ecological factors have been carefully considered by the glass container industry. Nonetheless, heretofore great difficulty has been encountered in the disposal or further use of soda lime glass when it is used or broken. The sole major method of using waste glass is re-melting. The glass industry currently collects about 3% waste glass and purchases, through dealers, a further 10% of waste glass for its production needs. However, re-melting requires color sorting and cleaning of the waste glass. For economic reasons, glass recycling by re-melting is only of limited feasibility. Furthermore, ecological problems have existed in connection with the use of other waste materials such as waste bricks, fly ash, waste perlite, some metal, and other scrap material.

As a consequence there was a long standing and well recognized need for a process by which such materials as soda lime glass, with its many advantageous properties, could be the subject of further beneficial use after its first use in containers, window glass or other forms.

In addition, building construction shapes, such as common brick produced in brick kilns, cement bricks, concrete blocks, cinder blocks, ornamental tile, roofing tile, backup brick and tile, sills, lintels and such other shapes of special dimension and configuration as may be required in building construction, are produced by combining their ingredients, such as sand, shale, clay, cement, aggregate, water, coloring matter, and so forth, in desired proportions. The batch is then mixed and formed into the desired shape by pressing, casting, mechanical molding, or extrusion, and finally hardening the shape by heating or air curing to produce the desired strength. As is well known to the art, some of the described construction shapes are fired at relatively high temperatures, in the range of from 2000°F to 2600°F as in the case of building brick, to bring about the necessary chemical and physical reactions among the ingredients of the shape in order to achieve bonding. In other instances, as in the case of concrete blocks, cinder blocks and concrete pipe, air curing or "setting up" is all that is required for strength development. However, none of the processes for the manufacture of fired construction shapes has hithertofore succeeded in producing a desired form at a relatively low firing temperature which combines compressive and tensile strengths greater than those of concrete with the ornamental properties of construction shapes.

SUMMARY OF THE INVENTION

The present invention has overcome the heretofore existent problems and provides a "structural clay product" utilizing as an integral part thereof waste or broken soda lime glass which had been theretofore first used in another fashion such as a container or the like. In addition, in producing a strong durable and extremely attractive structural clay product other waste materials are utilized to further advance the ecological program.

The foregoing has been accomplished by providing a mixture of soda lime glass particles, other waste materials and ball clay which is compacted into any predetermined form. The mixture is compacted in such fashion that its density be maximized and its porosity minimized and then heated to a relatively low firing temperature of less than 1900°F. There is no chemical reaction or molecular disturbance.

In addition to the soda lime glass which is required, a great variety of other materials may be utilized in forming the structural clay product of the present invention. All that is necessary is that the waste material does not melt, decompose, or disintegrate at a temperature below the low firing temperature involved; does not undergo chemical reaction during the firing process and does not have a vastly different coefficient of expansion from the soda lime glass. Therefore virtually all ceramics and many inorganic materials such as waste bricks, fly ash, tile, etc. may be used.

DETAILED DESCRIPTION OF THE INVENTION

According to the present invention a glass bonded ceramic product of great tensile strength durability is produced by using soda lime glass, other waste materials and clay. "Glass," in its broadest sense, includes vastly different chemical compositions, such as those found in all ceramic applications, namely, refractories, electronics, whitewares, abrasives, ceramic to metal systems and structural clay products. The present invention involves only structural clay products utilizing waste materials and the common glass used in containers, windows, etc., i.e. soda lime glass. Thus the glass involved is not of special composition as is often found in the other areas of ceramic manufacture for example "frits," "crystallized vitreous materials, "fluxes," etc.

The glass in the present invention is not used as a "flux", that is in very small quantities, to initiate chemical reaction with the other ingredients, at lower than normal firing temperatures.

The structural clay product of the present invention is produced as a fired shape from a thixotropic, fuseble (joined by heating) mixture of relatively finely divided soda lime glass, properly sized aggregates or inorganic fillers from a large class of waste material, ball clay and water.

The aggregate or inorganic filler component of the structural clay product has ecological ramifications in that it may comprise waste material which is otherwise useless or not disposable. All that is required is that it will not melt, decompose, or disintegrate below the low firing temperature utilized to fire the composition and that its coefficient of thermal expansion does not vary greatly from that of soda lime glass.

The size of the aggregate will vary depending upon the properties desired in the fired shape. Materials which can be used as the aggregate or filler include waste bricks, fly-ash, light-weight aggregates such as expanded shale, some gravel, waste ceramic building blocks, some igneous rock, metal scrap in limited amounts and even large particles of glass may be attractively used, provided they are larger in size than finely divided glass employed to form the binder. Some demolition rubble, mine tailings, etc., can also be used as aggregate.

While the size of the aggregate, as such may vary, it is preferred that the particle size distribution be such that the packing density of the mixture is maximized and that porosity be minimized. The maximum particle size obviously depends upon the properties and texture desired in the finished article. Because the aggregate particles are rigid, and of indefinite and varied shapes there are numerous voids between them. To ensure maximum strength of the fired product, it is desirable that these voids be filled with smaller sized aggregate particles. As a general rule, however, the mixture will comprise about 30 weight per cent (e.g. 20 to 40 weight per cent) of particles having the largest particle size, and about 25 weight per cent (e.g. 15 to 35 weight per cent) of particles of less than 80 mesh (U.S. Series). The balance of the composition comprises intermediate size fractions in approximately equal parts by weight. For example, assuming a mixture containing particles having sizes of up to about ⅜ inch, a typical distribution might be 25% ⅜ inch to 4 mesh; 25% minus 80 mesh and the balance 80 mesh to 4 mesh; e.g. equal parts of 4 to 10 mesh, 10 to 28 mesh and 28 to 80 mesh fractions. In determining the relative proportions of solids, the finely divided glass employed to provide binder should be included in the minus 80 mesh fraction.

The structural clay product of the present invention is unique in its utilization of a particular type of glass, namely soda lime glass. The use of this type of glass in broken and ultimately ground or crushed form may substantially overcome the heretofore existent ecological problems which providing a very useful, attractive and beneficial product.

The term "glass" as used herein is an inorganic product of fusion, cooled to a rigid condition without crystallization, comprising a major amount (at least 50 weight per cent) of silica ($SiO_2$), and at least two other inorganic oxides, usually oxides of sodium, potassium, calcium, magnesium, aluminum, or barium, in mutual solution. Typically, the common soda lime glass comprises 65–73 weight per cent silica, 1–5 weight per cent alumina ($Al_2O_3$), 1–10 weight per cent calcium oxide (CaO), up to 5 weight per cent magnesium oxide (MgO), 5 to 20 weight per cent sodium oxide ($Na_2O$) and up to 2 weight per cent potassium oxide ($K_2O$). It is desirable, however, that the glass composition be such that the finely divided glass will soften at a temperature below about 1900°F and preferably in the range of from about 1300°F to almost 1850°F.

The particles of glass should have sizes such that they readily and uniformly disperse through the structural clay product and minimize the porosity thereof. The particle sizes can vary for each product depending upon its end use and structural capacity and more than one size can be used in one product. The glass used as the binder should all pass through a 80 mesh screen (United States Standard Series) and when fired at the moderate temperatures softens and flows forming the binding agent for the aggregates and holding the mass together.

The glass forming the binder may be obtained from any suitable source. It is an advantage of this invention, however, that the glass can be waste glass from glass manufacturing operations, or glass reclaimed from domestic or other refuse, such as municipal dumps and the like. Such glass does not need color sorting or cleaning.

The proportion of glass to aggregate is not narrowly critical, provided there is sufficient finely divided glass to bond the aggregate. Ordinarily however, the finely divided soda lime glass will comprise at least about 8 weight per cent of the composition prior to firing. The maximum amount of finely divided glass will vary, depending upon the properties desired in the final fired shape, but ordinarily will not exceed 35 weight per cent of the composition prior to firing. Amounts in the range of from about 15 to about 25 weight per cent have been found most useful. It is emphasized that these relatively large amounts of glass must be used because of the method of bonding. It will be realized, however, that the aggregate may include from about 8 to 94 weight per cent of soda lime glass, of which at least 8 weight per cent and preferably from about 8 to 25 weight per cent will be in such finely divided binder form, all on the basis of the overall particulate composition prior to firing.

The aggregate particles do not fuse together per se and the glass acts as an adhesive in "glue binding" the composition together. Thus, there is no chemical reaction between, and very little molecular redistribution of, the materials themselves. The glass in its viscous form coats the aggregate, fills the interstices and bonds the material into a product of high tensile strength and rigidity.

The glass can be more or less viscous depending upon the requirements with a high viscosity-low temperature minimum of 1300°F and a low viscosity-high temperature maximum of 1900°F. There is no sintering required, as in bonding ceramics wherein a transfer of molecules is accomplished, nor is there an "in situ" production of glass by high temperature firing, as often achieved in refractories. These are both completely different products and processes from those of the present invention.

A third required ingredient in this structural clay product is "ball clay" i.e. a highly plastic, fine-grained refractory clay composed largely of montmorillonite. Typically, ball clay comprises 47–56 weight per cent silica, 33–30 weight per cent alumina, up to 2.1 weight per cent ferric oxide ($Fe_2O_3$), up to 0.8 weight percent of calcium and/or magnesium oxides, from 0.8 to 5.5 weight per cent of potassium and/or sodium oxides and 8–16 weight per cent combined water.

The amount of ball clay employed is an amount sufficient to provide thixotropic properties in conjunction with aggregate particle size distribution to the mixture of finely divided glass and aggregate. Ordinarily, this requires at least about 2 weight per cent of the ball clay prior to firing, with amounts in the range of from about 2 to about 10 weight per cent being preferred. When combined with the finely divided glass binder, there usually is employed from about 0.1 to about 1.25 parts ball clay per part of finely divided glass.

Water is added to the mixture to make it moldable. The amount of water obviously will depend upon the amount of ball clay as well as the tendency of the aggregate to absorb water. In general, however, water will not constitute more than about 20 weight per cent of the mix prior to firing. More typically, the water content of the mix prior to firing will be in the range of from about 3 to about 15 weight per cent. It is also desirable to employ a clay dispersant, such as sodium tripolyphosphate to ensure that the ball clay is dispersed in the water.

After mixing the finely divided glass binder and aggregate and, if desired, the ball clay and water, the resulting mixture is preferably formed into the desired shape by vibrocompaction in which porosity is reduced to its lowest levels. For example, while most structural clay products have a porosity of between 25 to 35% after firing, the porosity of the product of the present invention is between 2–20% porosity and preferably from about 8–13% porosity.

After forming to the desired shape, the mixture is dried, then fired in any suitable manner, as through the use of intermittent or continuous furnaces applying direct or indirect heat. It is necessary only to heat the mixture sufficiently to soften the finely divided glass and allow it to flow around and bond to the filler. The time and temperature of firing will depend upon the dimensions of the shape, and the rate of heat transfer between the furnace and the charge as well as within the shape. Ordinarily firing temperatures in the range of from about 1300°F to about 1900°F and soak periods of from about 15 minutes to about 8 hours, preferably from about 45 minutes to about 4 hours have been found useful.

After firing, the shape or shapes are allowed to cool. The resulting product is very attractive and colorful and possesses outstanding tensile and compressive strength. On the other hand, the shape is suitable for machining, drilling, grinding, and polishing by virtue of the glass-like nature of the bond achieved through the use of finely divided glass as a binder.

As an example, a structural clay block of a one square foot size and one inch thickness and weighing ten pounds was produced with 6.3 lbs. of crushed brick, 3.1 lbs. of soda lime glass (1.9 lbs. passing through an 80 mesh screen and 1.2 lbs. through a 28 mesh screen and remaining on an 80 mesh screen), and 0.6 lbs. of moldable ball clay.

The following examples are further illustrative:

EXAMPLE I

Eighty-one parts by weight of building rubble were mixed with 13 parts by weight of finely divided glass. Then 6 parts by weight of plastic ball clay were added and the resulting mixture was dry mixed for 1 minute. To this dry mix, 7 parts by weight of water containing 0.2 weight per cent of sodium tripolyphosphate as a clay dispersant were added, and the wet mixture was then blended for 3 minutes. After this time the mixture was thixotropically cast into a mold. When completely formed, vibration was ceased and after 2 hours drying, the mold was removed. The specimen was then placed into a furnace and the furnace temperature was raised to 1700°F during a 4 hour period. After 2 hours on temperature the specimen was removed. When completely cool, the specimen had a crushing strength of 5868 psi, a modulus of rupture of 837 psi, water absorption of 5.91% and a saturation coefficient of 0.76.

EXAMPLE II

Sixty-three parts by weight of building rubble were mixed with 31 parts by weight of glass, part of which is finely divided. Then 6 parts by weight of plastic ball clay were added and the resulting mixture was dry mixed for one minute. To this dry mix, 7 parts by weight of water containing 0.2 weight per cent of sodium tripolyphosphate as a clay dispersant were added, and the wet mixture was then blended for 3 minutes. After this time the mixture was thixotropically cast into a mold. When completely formed, vibration was ceased and after 2 hours drying, the mold was removed. The specimen was then placed into a furnace and the furnace temperature was raised to 1700°F during a 4 hour period. After 2 hours on temperature the furnace was allowed to cool to room temperature and the specimen removed. When completely cool, the specimen had a crushing strength of 13,500 psi, a modulus of rupture of 1505 psi, water absorption of 2.47% and a saturation coefficient of 0.45.

EXAMPLE III

Ninety-four parts by weight of glass (19 parts by weight through 80 mesh) were mixed together. Six parts by weight of plastic ball clay were added and the mixture was dry mixed for one minute. To this dry mix, 7 parts by weight of water containing 0.2 weight per cent of sodium tripolyphosphate as a clay dispersant were added, and the wet mixture was blended for 3 minutes. After this time the mix was thixotropically cast into a mold. When completely formed, vibration was ceased and after 2 hours drying, the mold was removed. The specimen was then placed into a furnace and the furnace temperature was raised to 1450°F during a 4 hour period. After 2 hours on temperature, the furnace was cooled back to room temperature and the specimen when removed, had a crushing strength 11,170 psi, a modulus of rupture of 1,944 psi, a water absorption of 1.34% and a saturation coefficient of 0.56.

From the foregoing examples, it is evident that the present invention affords a fired construction shape having extremely desirable physical properties. The properties of the products of Examples I-III are summarized in tabular form below and compared with the corresponding properties of a typical high strength concrete.

| Property | Example I | Example II | Example III | High Strength Concrete |
|---|---|---|---|---|
| Crushing strength, psi | 5865 | 13,500 | 11,170 | 2787 |
| Modulus of rupture, psi | 837 | 1,505 | 1,944 | 412 |
| Water absorption, % | 5.91 | 2.47 | 1.34 | 4.86 |

Thus, there is presented by the present invention a highly attractive, durable and economic structural clay product in which predetermined shapes may be attained while nevertheless providing a solution to an ecological problem.

While the invention has been described in specific illustrative detail, it will be understood that this description is not intended to limit the scope of the invention which is as defined in the appended claims.

What is claimed is:

1. A process for producing a soda lime glass physically bonded structural product comprising the steps of:
   a. forming a moldable, thioxtropic particulate composition of low porosity and high packing density by mixing:
      1. particulate inorganic inert aggregate;
      2. from 8 to 35 weight per cent finely divided waste soda lime glass whose particles have a size of less than 80 mesh;

3. ball clay in an amount of at least 2 weight per cent and sufficient to render the mixture thioxtropic; and
4. water in an amount not greater than 20 weight per cent to make said mixture moldable, the particle size of said aggregate being greater than the particle size of said finely divided waste soda lime glass and the particle size distribution of said aggregate and said finely divided glass being such that the mixture thereof contains 15 to 35 weight per cent of particles whose size is less than 80 mesh;

b. forming said mixture into a predetermined shape;
c. drying, then firing said shaped mixture at a temperature below 1900°F and sufficient to soften said finely divided soda lime glass and allow it to flow around and physically bond to said particulate aggregate substantially without chemical reaction; and
d. cooling said fired shape.

2. A process according to claim 1 wherein the porosity of said composition after cooling is between 2 and 20%.

3. A process according to claim 1 in which said particulate inert aggregate comprises particulate waste material.

4. A process according to claim 1 wherein soda lime glass comprises from about 8 to 94 weight per cent of said particulate composition, provided no more than 35 per cent of said composition is finely divided soda lime glass.

5. A process according to claim 1 wherein said finely divided soda lime glass comprises from about 15 to 25 weight per cent of said particulate composition.

6. A process according to claim 1 wherein said ball clay comprises from about 2 to about 10 weight per cent of said particulate composition.

7. A binder composition comprising finely divided soda lime glass, having a particle size not greater than 80 mesh, in admixture with from about 0.1 to about 1.25 parts by weight of ball clay per part of finely divided soda lime glass.

8. A fired, soda lime glass physically bonded structural product of low porosity produced in accordance with the process of claim 1.

9. A process for producing soda lime glass physically bonded structural clay products comprising the steps of:
a. forming into a predetermined shape a particulate composition of low porosity from inert aggregate particles, including a clay dispersant, 15 to 25 weight per cent finely divided waste soda lime glass, 2 to 10 weight per cent ball clay and 3 to 15 weight per cent water;
b. drying, then firing said shaped particulate composition for from 45 minutes to 4 hours at a temperature below 1900°F and sufficient to soften said soda lime glass and allow it to flow around and physically bond to said inert aggregate particles substantially without chemical reaction; and
c. cooling said shaped particulate composition.

10. A fired, soda lime glass physically bonded structural clay product of low porosity comprising:
a. a mass of randomly distributed inert aggregate particles;
b. a binder of randomly distributed soda lime glass coating said aggregate particles and physically bonding said product together and comprising 15 to 25 weight per cent of said product; and
c. an admixture of ball clay comprising 2 to 10 weight per cent of said product; said product being of relatively maximum packing density to provide tensile strength and durability.

* * * * *